United States Patent
Kikinis et al.

[11] Patent Number: 5,633,920
[45] Date of Patent: May 27, 1997

[54] SMART PHONE

[75] Inventors: Dan Kikinis, Saratoga; Pascal Dornier, Sunnyvale, both of Calif.

[73] Assignee: Elonex I.P. Holdings, Ltd., London, England

[21] Appl. No.: 593,547

[22] Filed: Jan. 30, 1996

Related U.S. Application Data

[63] Continuation of Ser. No. 195,123, Feb. 10, 1994, abandoned.

[51] Int. Cl.$^6$ .................. H04M 15/00; H04M 1/00; H04M 3/00; G06K 19/06
[52] U.S. Cl. .................. 379/130; 379/357; 379/396; 235/492; 345/905
[58] Field of Search .................. 379/88, 93, 149, 379/145, 130, 357, 387, 396; 439/131; 235/380, 492; 345/901, 903, 905, 156

[56] References Cited

U.S. PATENT DOCUMENTS

| | | | |
|---|---|---|---|
| 4,935,956 | 6/1990 | Hellwarth et al. | 379/155 X |
| 5,036,513 | 7/1991 | Greenblatt | 379/93 X |
| 5,119,414 | 6/1992 | Izumi | 379/357 |
| 5,146,493 | 9/1992 | Kiguchi et al. | 379/357 |
| 5,197,092 | 3/1993 | Bamburak | 379/357 |
| 5,335,276 | 8/1994 | Thompson et al. | 379/58 |
| 5,369,700 | 11/1994 | Koura et al. | 379/387 |
| 5,373,149 | 12/1994 | Rasmussen | 235/492 |

FOREIGN PATENT DOCUMENTS

| | | | |
|---|---|---|---|
| 376364 | 2/1991 | Japan | 379/58 |

*Primary Examiner*—Wing F. Chan
*Assistant Examiner*—Paul Loomis
*Attorney, Agent, or Firm*—Donald R. Boys

[57] ABSTRACT

A business telephone system employs digital signal processing in a digital telephone having a serial link for connection to a general-purpose computer. The Smart Phone is thus the central intelligence for the system, which may utilize a PBX connected in a LAN network to multiple computers, including file servers, and each computer may have one or more Smart Phones connected. In one embodiment, docking bays in the phone provide an ability to interchange functional modules, including DSP modules. The docking bays and functional modules may be configured to PCMCIA standards. In another embodiment, a docking bay, which may also be PCMCIA, has a physical window allowing access to an input area on a docked module, wherein the docked module is an intelligent module with a CPU, memory, and a bus structure, affording control of the smart phone and the entire system through the input interface of the docked module.

24 Claims, 8 Drawing Sheets

Smart Phone ASIC        Pin Count        12/9/93

| Function | I/O Pins |
|---|---|
| PC Communications section (PCC): | |
| PCC Receiver | 1 |
| PCC Transmitter | 2 |
| PCC PLL | 4 |
| OSC | 2 |
| Microprocessor interface section: | 30 |
| PCMCIA Bus section: | 60 |
| ISDN Receiver | 1 |
| ISDN transmitter | 2 |
| Digital Multi-Protocol communications controller section: | none |
| Telephone Set section: | |
| Keypad interface | 14 |
| LCD Interface | 12 |
| CODEC Interface | 9 |
| Speaker control | 4 |
| Hook switch (handset) | 1 |
| Hook switch (analog input) | 1 |
| Power & Ground section: | |
| Power | 8 |
| Ground | 9 |

Total Pins 160

SMART PHONE

CROSS REFERENCE TO RELATED APPLICATIONS

This is a continuation of application Ser. No. 08/195,123 filed Feb. 10, 1994, now abandoned.

FIELD OF THE INVENTION

The present invention is in the area of telecommunication systems and pertains in particular to integration of telephone devices with computers by use of digital signal processors.

BACKGROUND OF THE INVENTION

Since the advent of personal computers, manufacturers have sought to integrate voice and data communication equipment. While early attempts at this integration met with mixed results, new products integrate all the functionality of a traditional phone with state-of-the-art, computer-supported switching systems, known in the art as private branch exchanges (PBXs).

One significant development in the art is digital transmission as the predominant method of signal transmission within a PBX. Digital techniques allow high-speed data transmission over twisted-pair wiring formerly used only for analog voice transmission. Integrated voice-data terminals, adapters within telephones, and stand-alone unit provide for sophisticated functions, such as simultaneous voice and data transmission.

A key element in development of digital PBX systems is digital signal processing (DSP) technology. A DSP unit is essentially a specialized microprocessor configured to process digitized analog signals. Unlike ordinary microprocessors, DSPs often have several paths of communication with peripherals, allowing them to do much of their system bus work without intervention by a CPU. They provide improved interrupt service and fast, real-time processing.

Telephone instruments have also evolved, becoming more intelligent and versatile. Most PBXs support industry-standard, single-line telephone sets with rotary dials or push-button, dual-tone multifrequency (DTMF) dial pads. The general trend, however, is toward proprietary electronic digital multibutton telephone sets with local microprocessors supporting enhanced features and functions. Such buttons can be programmed for different users, multiple line and trunk access from the same telephone, and alphanumeric displays that provide information about a call in progress.

PBX today often use multiple microprocessors for common control. A CPU or main microprocessor coordinates functions of other microprocessors and establishes call connections. Secondary microprocessors are located on other circuit cards and sometimes in electronic digital telephones.

Data transmissions switched through a PBX, and often through a local area network (LAN), can communicate with other data devices or computers connected to the system or via a public switched network, with a wide variety of remote data devices and computers. Modern PBXs offer features such as call forwarding, least-cost routing, station message recording, conferencing, hunting, and call restrictions.

Figure 1:
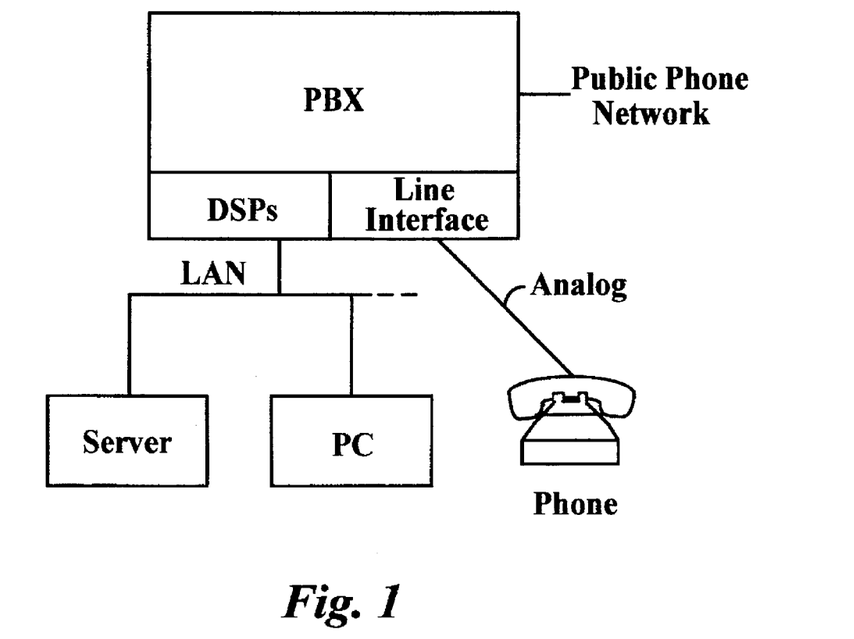
FIG. 1 is a block diagram of a Smart PBX system known to the inventors.
Figure 2:
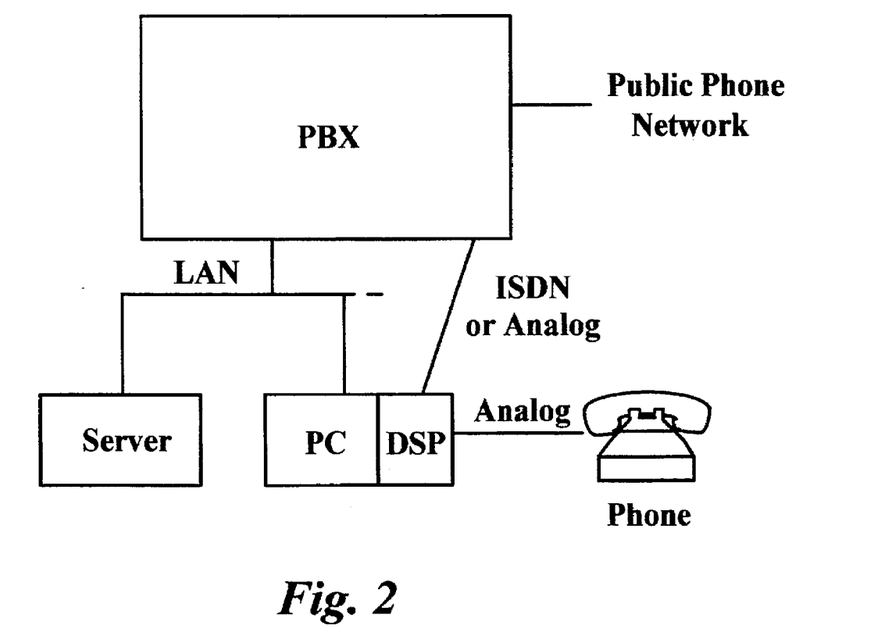
FIG. 2 is a block diagram of a telecommunication system with DSP module in the PC, also known to the inventors.

FIGS. 1 and 2 show two PBX design options known to the inventors. FIG. 1 is an external block diagram of what might be termed a "Smart PBX" system. This design features one or more DSP cards in the PBX supporting voice mail, faxing, and other telecommunications operations. Control of the PCs is achieved through a LAN network. This Smart PBX allows efficient internal switching, it can use existing telephones, and voice mail and other functions are independent of the PCs, so they work even if a PC is not available. On the other hand, this solution requires major redesign of the PBX, with attendant development problems. There is also the expense of replacing the installed base of PBXs.

FIG. 2 is a block diagram illustrating another possible solution. In this system a DSP unit is provided in the PC as a separate module, such as an expansion card. Such a system would typically use an Integrated Services Digital Network (ISDN) interface between PBX and DSP. Specialized multimedia functions can be passed through to the telephone system.

The system of FIG. 2 can be built using existing cards, there is a relatively low investment in hardware, and there is a relatively low cost in providing the DSP by sharing the case and power with the PC. This design is not very suitable for workstations, however; the user must install the adaptor card; and the PC is not a good environment for analog circuits due to EMI and switching noise, for example.

At present there is no inexpensive and simple way to provide a state-of-the-art telecommunication system. The big deterrent to a Smart PBX system, as in FIG. 1, is the high cost of the PBX. And a telecommunications system where the DSP function is in the PC, as in FIG. 2, is not entirely suitable because PCs typically have limited space for adapters and installation of an adapter and setup is an inconvenience for the user. Moreover, PCs are an undesirable environment for analog circuits due to electromagnetic interference and switching noise.

What is needed is a solution wherein a user may conveniently add and replace functional modules as needed. This is provided in the present invention by making the telephone into the caretaker of the DSP and other functional modules. The only change required in the installed base is a new Smart Phone, which may be easily and quickly attached to both PC and PBX. Such an innovation allows for expansion into full-service, multimedia telecommunication.

SUMMARY OF THE INVENTION

In an embodiment of the present invention, a Smart Phone is provided comprising control circuitry configured for managing operations of the digital telephone; an electronic memory connected to the control circuitry; a microphone-speaker unit connected to the control circuitry for audio input and output, including a coder/decoder (CODEC) for conversions between analog and digital data forms; and a user input interface connected to the control circuitry including a keypad for dialing and function selection. A telephone line port is provided in the control circuitry for connecting the digital telephone to a telephone line, and a serial communication port in the control circuitry provides communication with external digital equipment. There is in addition at least one Digital Signal Processor (DSP) microprocessor connected to the control circuitry for processing digitized audio signals.

The Smart Phone becomes the central intelligent element in a business telephone system, providing a means for upgrading existing systems to multimedia capability at the least trouble and expense, making use of existing PBX and computer systems in LANs.

In various embodiments of the telephone and the resulting system, the Smart Phone has docking bays for engaging functional modules. In one embodiment the docking bays are configured to Personal Computer Memory Card International Association (PCMCIA) standard for compatible cards, DSP units, memory cards, and many other peripheral systems may thus be easily and inexpensively interfaced to the Smart Phone and the multimedia system.

In another embodiment, a physical window is provided in combination with a docking bay, affording access to an input area of a docked functional module, whereby a docked intelligent functional module may be employed to control the Smart Phone and the entire business telephone system through the input area of the intelligent module.

DESCRIPTION OF THE PREFERRED EMBODIMENTS

Figure 3:
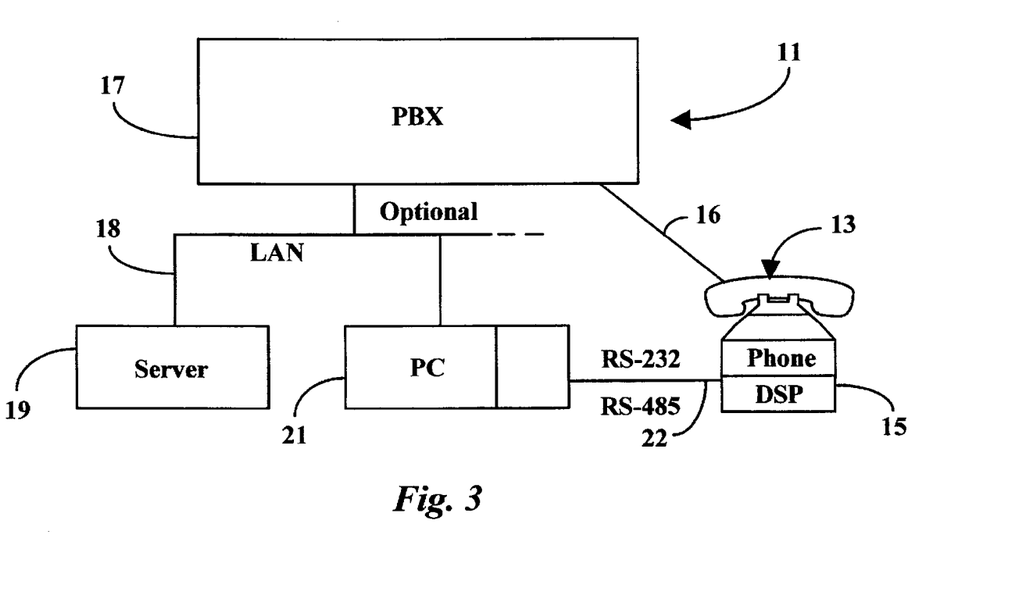
FIG. 3 is a block diagram of a Smart Phone system, according to an embodiment of the present invention.

FIG. 3 is a block diagram of a Smart Phone system 11 according to an embodiment of the present invention, having at least one Smart Phone 13 connected to a PBX 17 by preferably an ISDN (digital) line 16. This connection could alternately be an analog connection. PBX 17 is in turn connected on a LAN 18 to one or more PCs 21 and optionally one or more network servers 19. Each Smart Phone 13 is also connected by serial link 22 to a PC 21.

Smart Phone 13 comprises internal circuitry for communication with the PBX and the PC, and additionally one or more DSP functions may be hard wired into the Smart Phone circuitry or preferable reside on one or more removable, interchangeable modules.

In one embodiment, DSP units and other functional modules are implemented as PCMCIA cards. Such PCMCIA cards may be inserted into docking bays (not shown in FIG. 3) on the Smart Phone. The docking bays are configured to accept the standard physical design of PCMCIA cards, in this case preferable type II standard, including a multi-pin electrical connector. Since PCMCIA cards are designed for "hot" insertion, that is, a PCMCIA card can be slid into place while the power is on, one card slot can serve many functions within a single working session without rebooting the host PC.

Serial link 22 in one preferred embodiment is a standard RS-485 protocol link. It may be RS-232 in other embodiments. In an alternative preferred embodiment, this link may be a unique high-speed serial interface described more fully below with reference to FIG. 5.

Figure 4:
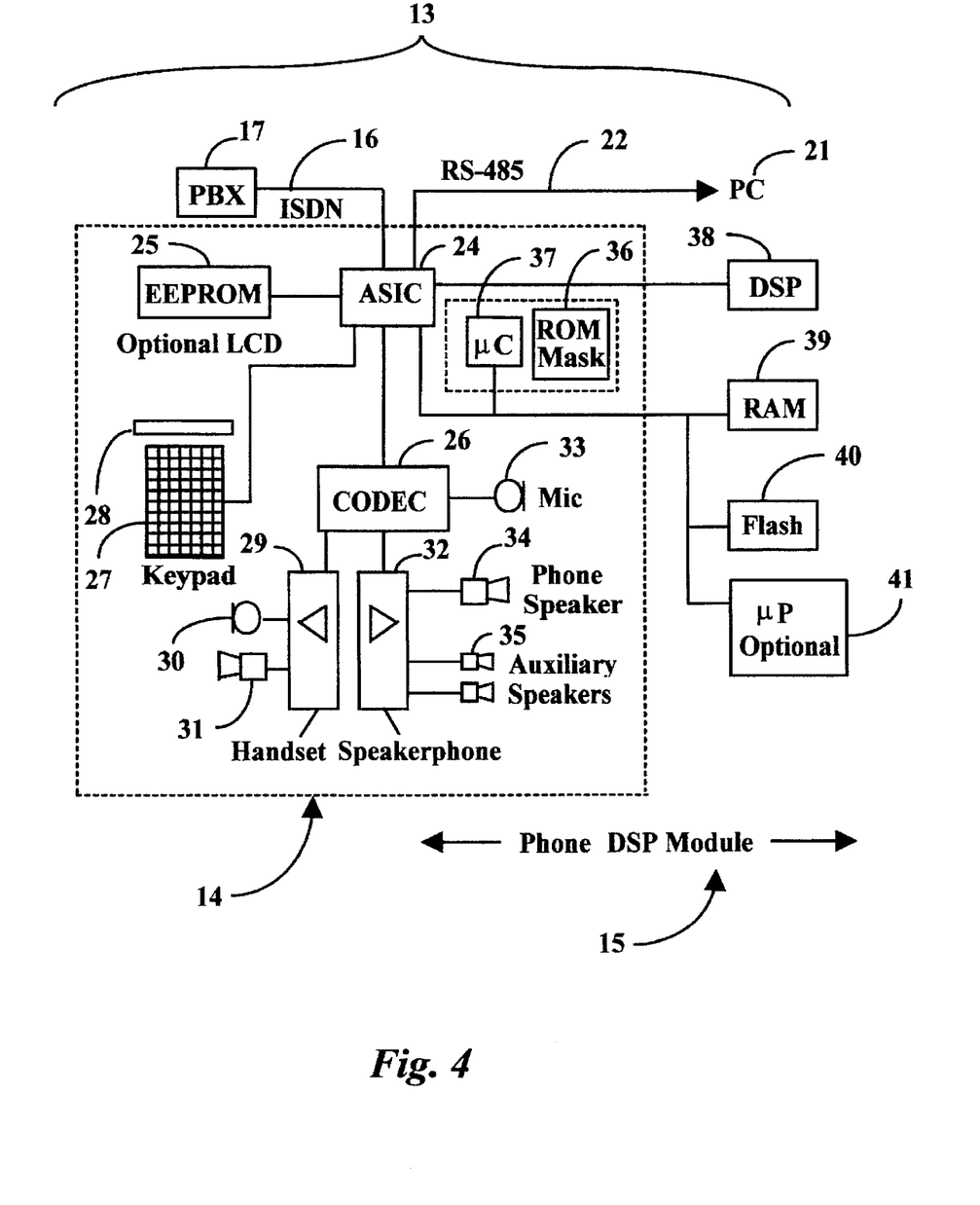
FIG. 4 is a block diagram of the Smart Phone device in the system of FIG. 3.

FIG. 4 is a block diagram of Smart Phone 13 shown in FIG. 3. PBX 17 is shown connected to the Smart Phone by ISDN line 16, and PC workstation 21 is shown connected to the Smart Phone through RS-485 line 22, as seen also in FIG. 3.

PC workstation 21 in this embodiment has a Telephony Application Programming Interface (TAPI) that coordinates Windows applications running on the PC with call functions on the Smart Phone. Any number of different TAPI and other telemanagement-type programs can be added to the PC workstation.

In FIG. 4, the Smart Phone device is shown partitioned into two main components, a telephone unit 14 and a DSP module 15. The heat of telephone unit 14 is an ASIC 24, which receives and transmits over both ISDN line 16 and RS-485 line 22, oversees the conversion of incoming data into the required output, and handles communication with other elements. ASIC 24 is connected to an EEPROM 25, a coder/decoder module (CODEC) 26, a keypad controller 27 with an optional liquid crystal display (LCD) 28, and to a microcontroller 37.

EEPROM 25 holds instructions for the phone connection to PBX 17. CODEC 26 supports the phone sound system, performing digital-to-analog and analog-to-digital data conversions through non-linear compression and decompression processes.

Audio input is from a microphone 30 on the Smart Phone handset 29 or a microphone 33 for a speakerphone 32. Audio is output through an amplifier through handset speaker 31 or a main speaker 34 on the speakerphone. Optional auxiliary speakers 35 provide stereo sound, with main speaker 34 optionally serving as subwoofer.

Mask read-only memory (ROM) 36 holds code, including dual-tone, multi-frequency (DTMF) wavetables and sound system wave tables, for microcontroller 37 connected to the ASIC.

DSP module 15 in FIG. 4 comprises DSP 38, RAM 39, flash ROM 40, and an optional microprocessor 41. A variety of signal processing functions can be integrated into a Smart Phone system through the DSP. Flash ROM 40 holds DSP firmware and it can also be programmed to compensate for corrupted code in ROM by a method known to the inventors, which is the subject of a separate patent application.

RAM 39 is the DSP workspace. It also acts as a buffer, holding data from PC 21 until it can be converted by ASIC 24.

Figure 5:
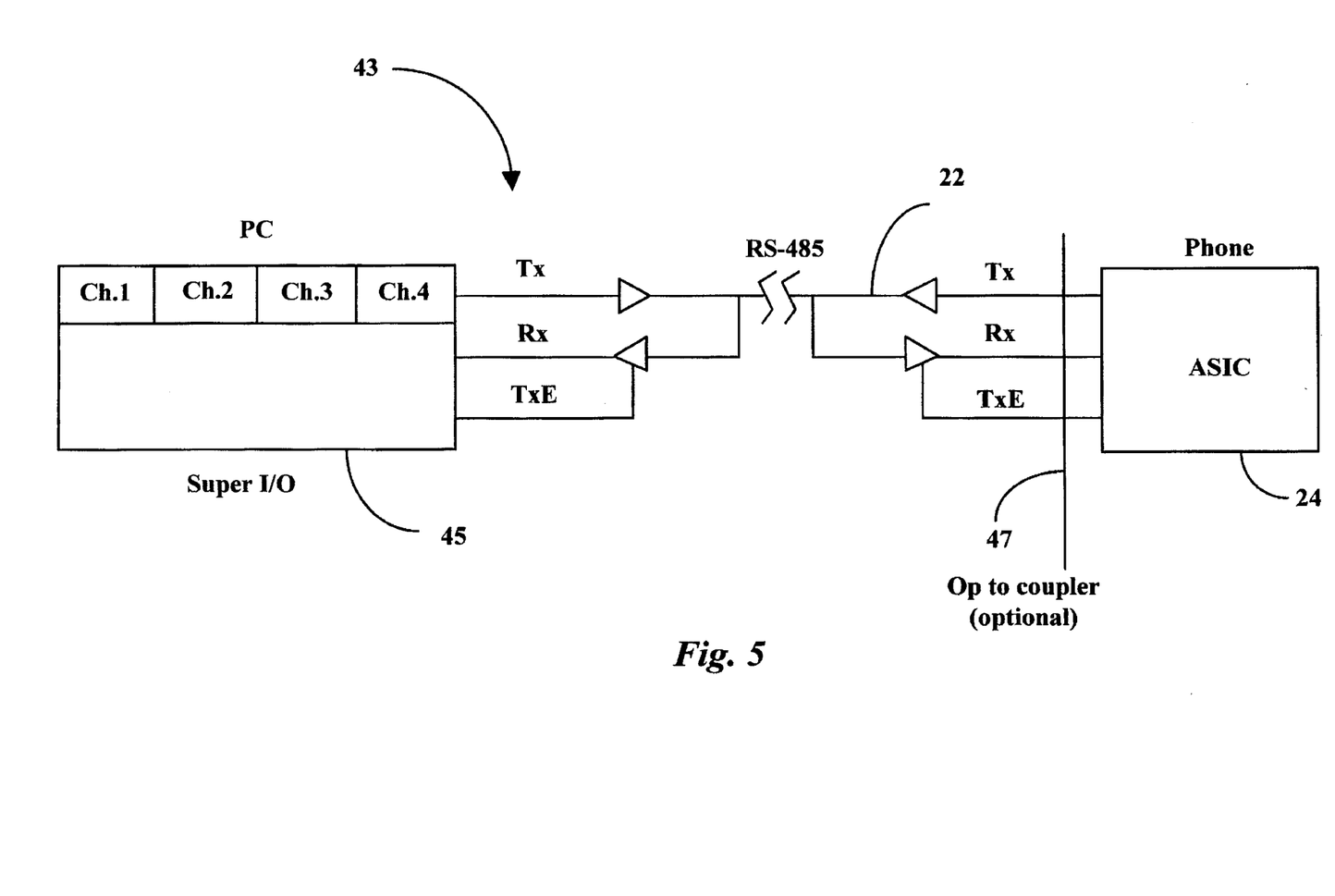
FIG. 5 is a schematic diagram of a specialized interface between Smart Phone and PC, according to an embodiment of the present invention.

As mentioned in the FIG. 3 description above, one embodiment incorporates a PC-Smart Phone interface through an RS-485 port. Many PCs, however, do not have RS-485 ports. FIG. 5 shows a specialized interface 43, which solves this problem by providing a plug-in interface that can be easily and inexpensively installed on PCs without an RS-485 port.

The interface as shown in FIG. 5 has a data cable 22 comprising one pair of differential data lines plus ground. In another embodiment there might be two pairs of differential lines, to separately transmit and receive data, plus ground, allowing higher speed transmissions.

The specialized interface has a modified Super I/O chip 45 with plug-in connector (not shown) on the PC side. Three pins in the Super I/O chip are reserved for PC-Smart Phone communications: Tx for transmit, Rx for receive, and TxE for transmit enable. The modified Super I/O chip logic can be set for whatever communication protocols are desired. For example, in FIG. 5 four channels are assigned as follows: Ch 1, raw line data for communications such as voice and prerecorded data; Ch2, DSP channel for fax and modem communications; Ch3, microprocessor and commands for Smart Phone enhanced functions; and Ch4, sound access for sound card functions from the PC. On the Smart Phone side of the specialized interface, ASIC chip 24 mirrors the Super I/O chip interface logic as described above. An optocoupler 47 is optionally included on the Smart Phone side for enhanced noise immunity. A typical transmission protocol might send 1 bit for handshaking, 2 bits for channel assignment, and 16 bits for data.

Figure 6:
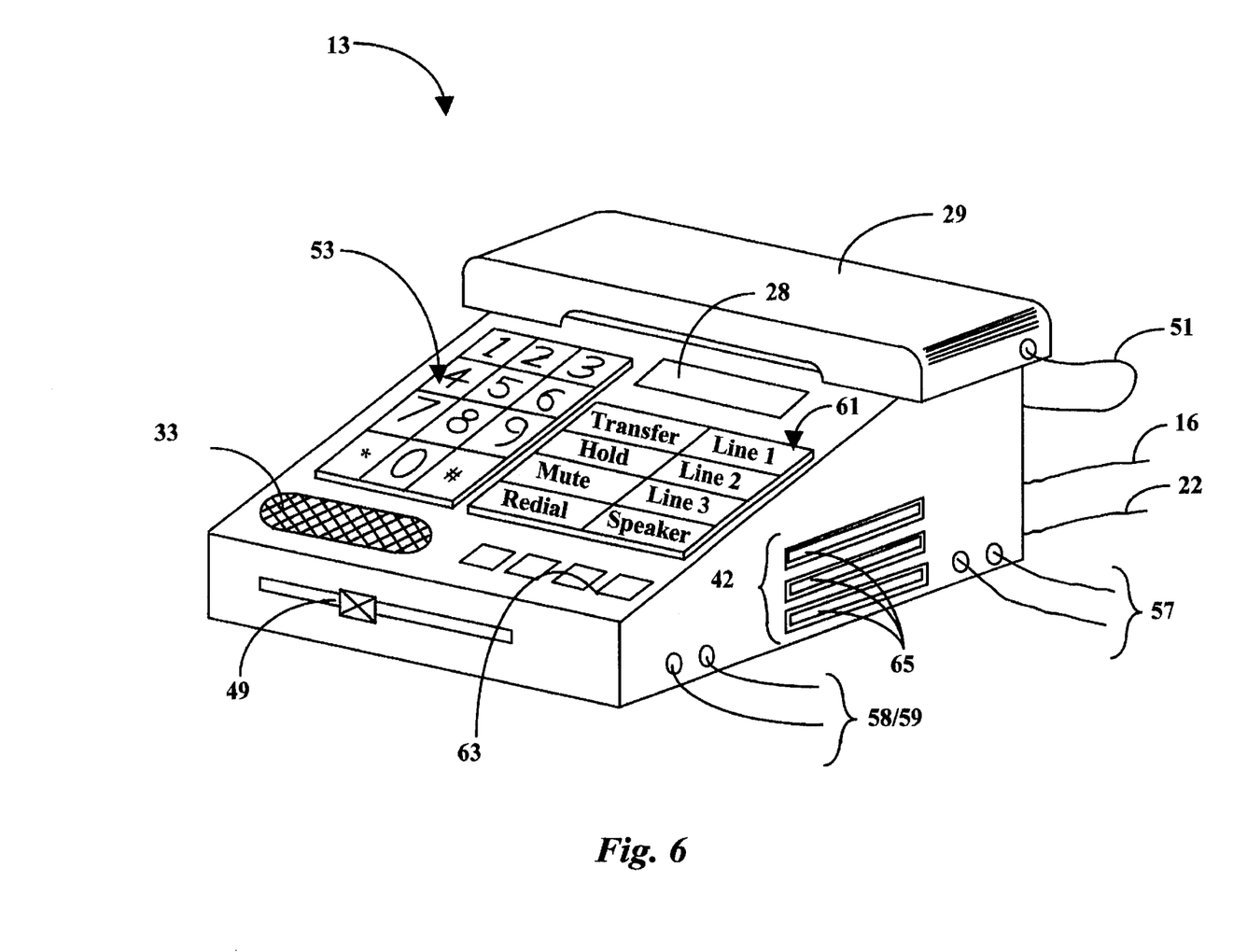
FIG. 6 is an isometric view of an exemplary Smart Phone according to an embodiment of the present invention, showing a user interface.

FIG. 6 is an isometric view of an exemplary user interface for a Smart Phone 13, having docking bays 15 providing standard connectors for three PCMCIA cards 65, one of which is reserved for a DSP module as described for FIG. 4.

In an alternative embodiment the docking bays may be located elsewhere on the Smart Phone, such as on one side or the other. In yet another embodiment, the docking bay might be separate, intact unit that is mechanically and electrically attached to the base of the Smart Phone. One or more additional docking bays could feasibly be added to the Smart Phone, either as built-in or externally attached units.

In FIG. 6, Smart Phone 13 also has a handset 29 with the usual microphone and speaker (not shown) and operates also as a speakerphone with a combination mic/speaker 33 and a volume control slider 49. Smart Phone 13 has the following externally wired interfaces: handset line 51, ISDN line 16 to PBX, and RS-485 line 22 to PC.

Optional, plug-in speaker interfaces 57 are for stereo output. In a variation, one or more analog interfaces 58 and 59 might be added to expand multimedia applications. Push-button DTMF dial pad 53 and programmable function buttons 61 provide user access to make calls and select basic Smart Phone functions, such as transfer, hold, mute, redial, line selection, and speakerphone on/off. Light-emitting diodes 63 (LED) or other type of signal lights indicate which phone lines are in use and/or when the speakerphone is on. An optional LCD display 28 provides a visual interface for the user to monitor calls.

Figure 7:
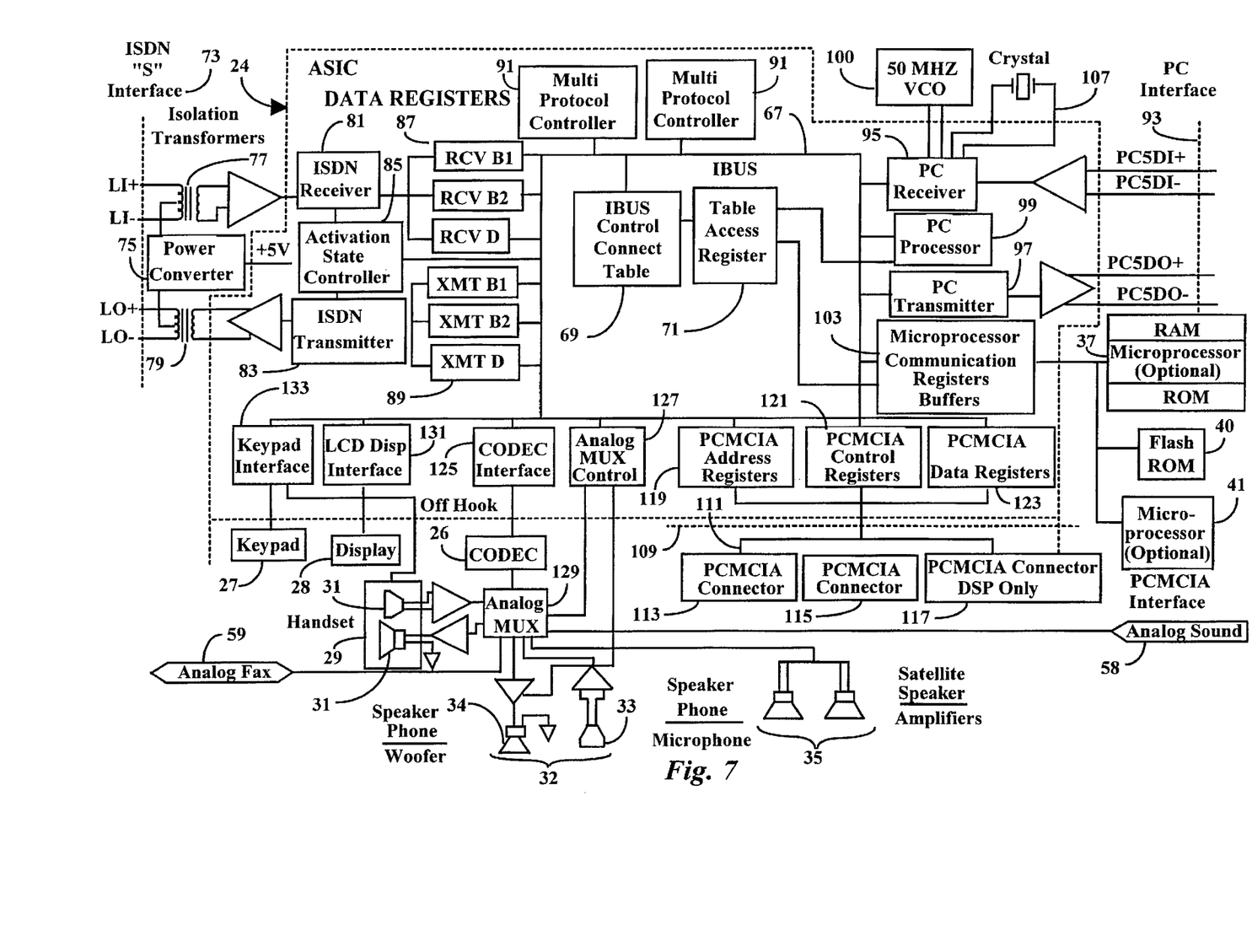
FIG. 7 is a block diagram of an application-specific integrated circuit (ASIC) for a Smart Phone, according to an embodiment of the present invention.

FIG. 7 is an internal block diagram of ASIC 24 of FIG. 4, with the features described relative to FIGS. 3 through 6. Internal communication is via internal bus (IBUS) 67. Use of the internal bus is controlled by a connect table 69, which is configured by an internal or external microprocessor, shown here as part of microcontroller 37. Table access register 71 provides a link for the microprocessor to perform this configuration. ASIC interface and components are described below:

ISDN "S" Interface 73.

Incoming and outgoing ISDN lines, LI and LO, link PBX 17 with the Smart Phone. An isolated power converter 75 supplies 5-volt dc power. Incoming signals pass through isolating pulse transformer 77 to ISDN receiver 81 and outgoing signals pass from ISDN transmitter 83 to isolating pulse transformer 79. An activation state controller 85 coordinates ISDN receiver and ISDN transmitter activity with the rest of ASIC 24. Receive data registers 87 and transmit data registers 89 temporarily store data for each bearer (B) channel, which can carry any kind of data (digitally encoded voice, FAX, text and numbers) and delta (D) channel, which carries call status and control signals and serves as a third data channel.

Multi-Protocol Controllers 91.

One or more multi-protocol controllers 91 provide serial data communications between PC 21 and other data terminal equipment via ISDN interface 73 and PC interface 93. The multi-protocol controllers handle asynchronous and synchronous formats, for example, high-level data link control (HDLC) and synchronous data link control (SDLC). This serial communication hardware, which appears to PC software as a standard PC serial interface register set, permits off-the-shelf communication software to run on the PC without modification.

PC Interface 93.

PC receiver 95 and PC transmitter 97 input and output data, respectively, from separate RS-485 data lines, PC serial data in (PCSDI) and PC serial data out (PCSDO). Although separate transmit and receive lines are preferred for high-speed, full-duplex communications, transmit and receive lines, in a variation, might be combined and connected to a single transceiver block in the ASIC. Such a connection would result in fewer wires in the PC interface but with somewhat increased ASIC complexity and decreased communication speed.

PC processor 99 responds to instructions from multi-protocol controllers 91 for disposition of the data and accesses address information from table access register 71 on the bus.

A phase-locked-loop (PLL) circuit with high-frequency oscillator (VCO) 100 locks on the PCSDI data stream. This recovered clock is used to clock incoming data and synchronize digital logic of the ASIC with Super I/O chip 45 in the PC, as shown in FIG. 5. Re-clocking PCSDI data in this manner permits operating the PC link at speeds greater than 50 Mbits/second. Very high-speed communication is necessary to permit real-time status reporting to Super I/O chip 45 of some of the attached devices on internal bus 67, for example, micro-protocol controllers 91 and PCMCIA interface 109 cards. Real-time status reporting is needed for software driver transparency.

On-board clock 101 runs ASIC digital logic when the PCSDI line is unavailable. Switchover between the two clock sources is done automatically by PC receiver 95.

Microprocessor Interface 103.

One or more microprocessors may interface with the ASIC. Location of the microprocessor can vary. For instance, one or more microprocessor could be outside the ASIC, on a separate chip on the circuit board or as part of a DSP module on a PCMCIA card, or a microprocessor could be implemented in the ASIC. In FIG. 7, a chip outside the ASIC contains micrcontroller 37 containing a microprocessor, RAM and ROM. Optional microprocessor 41 and flash ROM 40 outside the ASIC connect with microprocessor interface 103 as well. In one variation, a microprocessor 37 in the ASIC, performs limited DSP functions, while another microprocessor in a DSP module, optionally input through PCMCIA interface 109 (see below), might perform more complex functions. Many variations are possible due to modular design.

PCMCIA Interface 109.

An expansion bus 111 links PCMCIA connectors 113, 115, and 117 with internal PCMCIA address registers 119, control registers 121, and data registers 123. PCMCIA connector 117 is reserved for DSP module input, whereas PCMCIA connectors 113 and 115 are general-purpose expansion slots. Access to devices can be made software-transparent by including I/O and memory and address mapping logic in Super I/O chip 45 in the PC. When the Super I/O chip traps an I/O or memory access in a preprogrammed range, the Super I/O chip directs data access to the appropriate PCMCIA device plugged into one of the PCMCIA connectors 113, 115, or 117 (if DSP) of the Smart Phone.

CODEC Interface 125.

This interface connects to CODEC circuitry 26, which performs digital conversions on analog signals channeled through an analog multiplexer (MUX) 129 from phone audio system components and vice versa. The phone audio system includes a handset 29 with microphone 31 and speaker 30 and speakerphone 32 with microphone 34 and speaker 33, and optional satellite speakers/amplifiers 35. An optional analog sound line 58 allows for multimedia expansion, whereas an optional analog fax line 59 permits use of standard, standalone analog-type fax devices. Analog MUX controller 127 on the ASIC bus controls analog MUX 129 activities and provides a low-pass filter for output from speaker 33. A low-pass filter is used when the built-in speaker is employed as a woofer in conjunction with the optional satellite speakers. A speakerphone, although included as part of this embodiment, is not essential to Smart Phone operation. In a simpler variation, phone sound might consist of a single speaker-microphone pair in the handset.

LCD Display Interface 131.

This interface to an optional liquid crystal display 28 on the Smart Phone provides a means to visually monitor incoming calls.

Keypad Interface 133.

An interface with phone keypad controller 27 provides a means for the Smart Phone to respond to input from DTMF keypad 53 and to function buttons 61. When Smart Phone handset 29 is being used, a signal is sent to keypad interface 133. Keypad interface 133 also controls LED lights 63 on the Smart Phone keypad panel.

Figure 8:
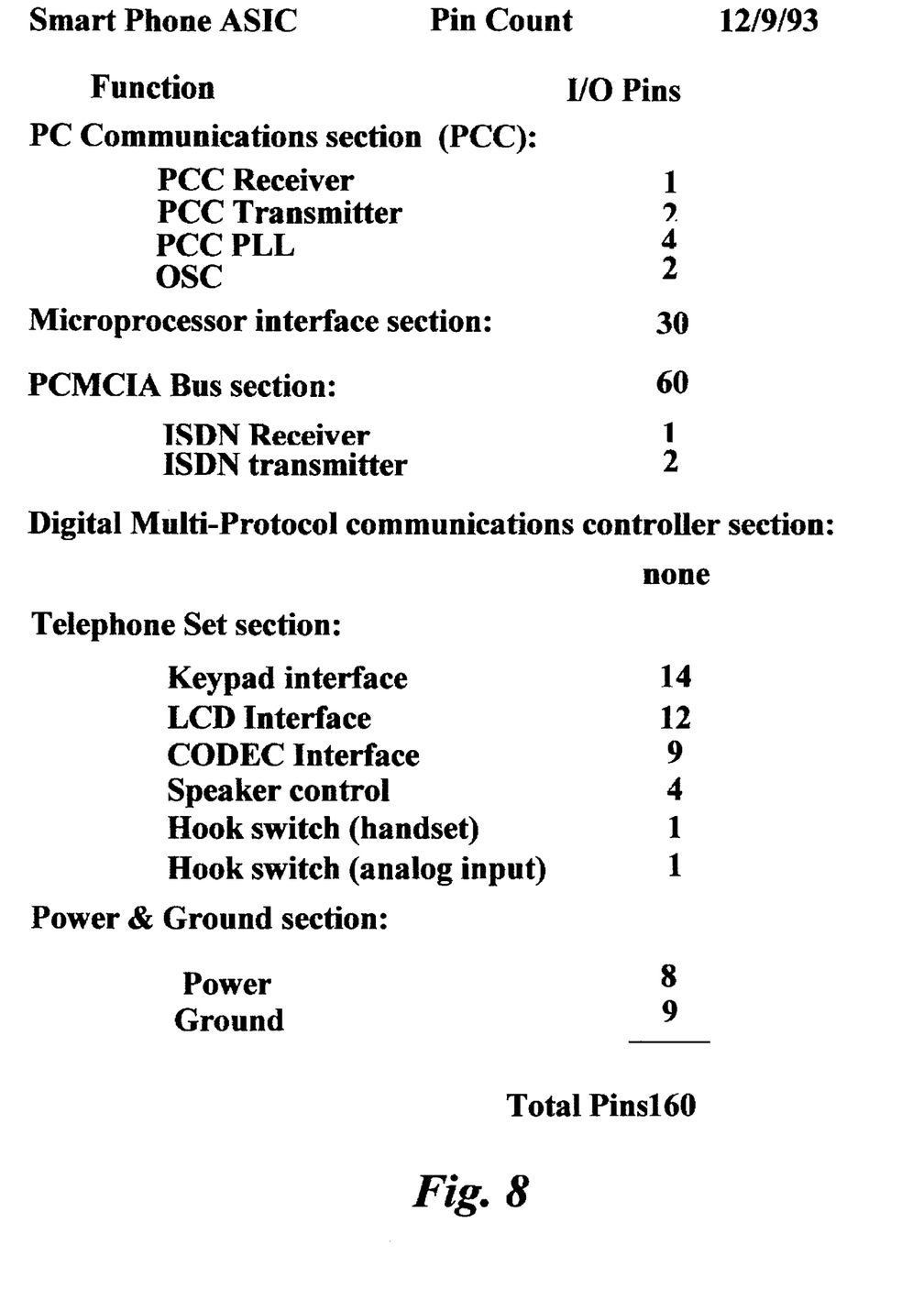
FIG. 8 is an approximation of pin count for a Smart Phone ASIC as shown in FIG. 7.

FIG. 8 is a tabulation of I/O pin count for one embodiment of the Smart Phone. The number of pins varies, of course, in different embodiments.

In summary, a Smart Phone 13 such as that described for FIGS. 3 through 8 has the following features:

Direct PC access to any Smart Phone via high-speed serial RS-485 line with optional, plug-in, specialized interface with modified Super I/O chip.

PBX with digital-type fax and modem that communicates with the Smart Phone through ISDN via a multiprotocol controller.

Modular docking bay on the Smart Phone with PCMCIA slots for DSP upgrades and multimedia expansion.

Software-transparent data communication between Smart Phone components such as multiprotocol communication controllers, PCMCIA I/O, and memory.

Synchronous data link control (SDLC) and asynchronous support.

High-quality analog sound input and mixing for speakerphone.

Standard analog phone device input ports, e.g., fax and modem.

Flash ROM reprogrammable from PC.

Phase-locked loop (PLL) support in ASIC.

A Smart Phone 13 such as that described in FIGS. 3 through 8 may be implemented with various levels of functionality tailored to the budget and needs of the purchaser. A lower-priced, basic Smart Phone model might only have a microprocessor residing inside or outside the ASIC. In addition to a fax/data ISDN line to a PBX, a PC interface and a speakerphone, basic Smart Phone functions can easily be expanded as needed with an inexpensive, low-end DSP chip, such as those currently available from Zilog and Motorola, to add features such as business audio (for tape recording), voice mail (with DTMF detection), data compression and decompression, and data encryption. The DSP can reside on a removable PCMCIA card that is plugged into a designated slot on the Smart Phone.

An upscaled Smart Phone model might add, to the above functions, capabilities for fax transmission and reception and V.32 bis data transmission mode, which will require a microprocessor and a high-quality DSP chip, such as those currently available from AT&T, ADI or TI. A top-of-the line Smart Phone product might offer, in addition to all of the above functions, multimedia I/O supported by stereo 16-bit digital/analog and analog/digital conversion.

Figure 9:
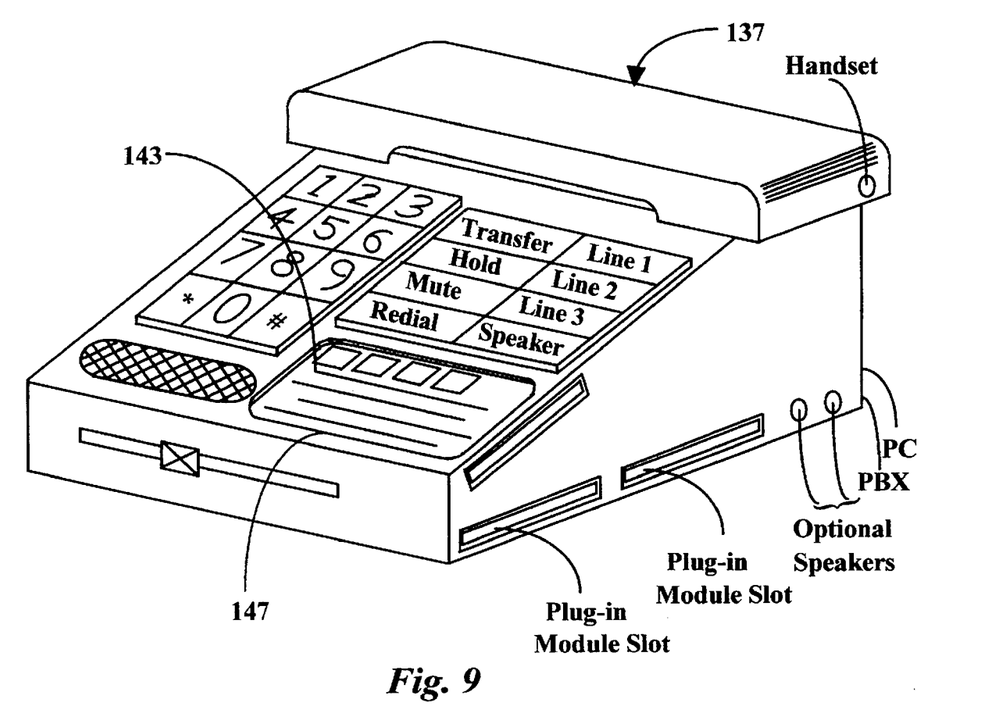
FIG. 9 is an isometric view of an alternative Smart Phone, showing a user interface incorporating a micro-personal digital assistant (μ-PDA), according to an embodiment of the invention.

FIG. 9 is an isometric view of a Smart Phone 137 according to an alternative embodiment wherein, in addition to the features described for FIGS. 3 through 8, a specialized portable computer unit 139, known to the inventors as a micro-personal digital assistant (μ-PDA), can be connected through a docking bay 141 with standard PCMCIA pin connectors in the Smart Phone. Such a μ-PDA 139 is shown docked in FIG. 9.

A typical μ-PDA user would be a business traveller who requires access to specific software applications such as spreadsheets, travel files with currency converters, fax programs, time zone clocks, address and telephone records, and the like.

A typical μ-PDA 139, which is about the size of a credit card, is modeled on a standard PCMCIA Type II form. It has a CPU, nonvolatile memory to store control routines for applications and data files, and a display overlaid with a touch-sensitive screen 143.

A physical window 147 in the Smart Phone housing allows touch-sensitive screen 143 to be used while the μ-PDA is docked. By so doing, a user may employ control routines stored and executable on the μ-PDA to control the phone system and all of the functions of the Smart Phone. For example, a user may access a list of business or personal contacts, select one, and a simple command will cause a call to be placed, including generating all of the dialing sequence and charge card numbers.

The embodiment of FIG. 9 is just one example of a Smart Phone configuration that can accommodate a μ-PDA.

Figure 10:
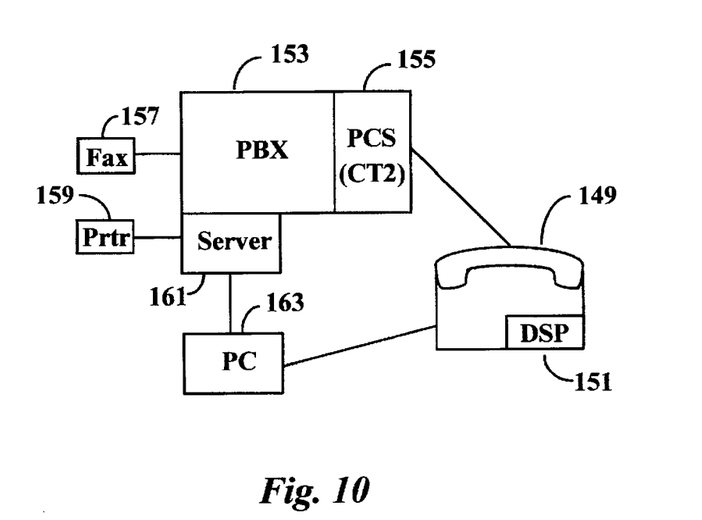
FIG. 10 is a block diagram of a cordless Smart Phone in an alternative embodiment of the invention.

FIG. 10 is a block diagram of a cordless Smart Phone 149 with interchangeable DSP module 151, according to an alternative embodiment of the invention. Cordless Smart Phone 149 has essentially the same features as the embodiments described above, and is capable of performing the same functions as those described for corded Smart Phone 13 in FIGS. 3 through 8. In addition, the user of a cordless Smart Phone 149 has the freedom to move about a room while using the device. In the cordless embodiment, a transceiver transmits and receives radio signals to and from a local PBX 153 through a miniature antenna inside the Smart Phone device.

Phone-PBX communications in the FIG. 10 example are through a personal communication system (PCS) with cordless telephony interface 155, such as well-known standard CT2. PBX 153 has optional fax 157 and printer 159 connections. A file server 161 is connected to PC 163 via a logical link through the PBX. For instance, a user might select a number to dial on the PC and the PBX will dial the number on the Smart Phone. One or more enhanced features on PCMCIA cards, including an optional DSP module, are plugged into PCMCIA docking bays located in the base or some other suitable location on the cordless Smart Phone unit.

As with the corded Smart Phone embodiment in FIGS. 3 through 8, one or more additional docking bays could feasibly be added to cordless Smart Phone 149, either as built-in or separate, mechanically attached units, to accommodate future PCMCIA card expansion needs. In a variation, a docking bay 141 for a μ-PDA device 139, as described for an alternative embodiment in FIG. 9, might be provided.

It will be apparent to one skilled in the art that there are a relatively large number of changes that may be made in the embodiments described without departing from the spirit and scope of the present invention. Some additions and alternatives have been mentioned above.

There are a number of equivalent ways the several features might be implemented without departing from the spirit and scope of the invention as well. There are, for example, numerous alternate configurations that would work with a Smart Phone. For example, the PBX might transmit digital and analog data. In particular, an analog line from the PBX might support older fax machines and other analog communication equipment that might be part of a user's system. Likewise, the PC might also have an analog interface so, for instance, a document scanner can read data into the PC and the data can be transmitted to the Smart Phone. In another configuration, a PBX is not even needed. Smart Phone input could instead be through standard public telephone lines, for example, ISDN lines. There are many sorts of cases and applications that might be used. Different embodiments can be rendered with different specifications. For instance, although it was originally conceived for a Smart Phone system embodiment, the specialized, plug-in RS-485 interface in FIG. 5 could become a hardware standard for PCs. There are many deviations that all fall within the spirit and scope of the invention.

What is claimed is:

1. A digital telephone comprising:
   control circuitry for managing operations of the digital telephone;
   a microphone-speaker unit connected to the control circuitry for audio input and output, including a coder/decoder (CODEC) for conversions between analog and digital data forms;
   a user input interface connected to the control circuitry for dialing and function selection;
   a telephone line port coupled to the control circuitry, for connecting the digital telephone to a telephone line;
   a serial communication port coupled to the control circuitry for providing communication with external digital equipment;
   a hand-held computer unit having a bus connector interface and a touch-screen input/display interface implemented on one surface; and
   at least one docking bay coupled to the control circuitry and adapted for docking the hand-held computer, the at least one docking bay having a physical window allowing a user access to the touch-screen input/display interface of the hand-held computer in docked position.

2. A digital telephone as in claim 1 wherein the control circuitry is implemented as at least one application-specific integrated circuit (ASIC).

3. A digital telephone as in claim 1 wherein the control circuitry comprises a mask read only memory (ROM) for storing control routines.

4. A digital telephone as in claim 1 wherein the microphone-speaker unit comprises a handset connected to the control circuitry.

5. A digital telephone as in claim 1 wherein the microphone-speaker unit is configured as a speakerphone.

6. A digital telephone as in claim 1 wherein the user input interface comprises an LCD display for displaying functional and operational data to a user.

7. A digital telephone as in claim 1 wherein the input interface comprises LEDs for indicating operational data to a user.

8. A digital telephone as in claim 1 wherein the telephone line port is configured for Integrated Services Digital Network (ISDN) protocol.

9. A digital telephone as in claim 1 wherein the serial communication port is configured for one of RS-232 and RS-485 protocol.

10. A business telephone system comprising:
    a hand-held computer unit having a bus connector interface and a touch-screen input/display interface implemented on one surface;
    a digital telephone having control circuitry coupled by a bus system to at least one docking bay adapted for docking the hand-held computer, the at least one docking bay having a physical window allowing a user access to the touch-screen input/display interface of the hand-held computer in docked position;
    a phone line interface to the digital telephone;
    a general-purpose computer; and
    a serial communication link between the digital telephone and the general-purpose computer;
    wherein a user controls the digital telephone through the touch-screen input/display interface of the hand-held computer.

11. A business telephone system as in claim 10 wherein the phone line interface is configured as an Integrated Services Digital Network (ISDN) interface.

12. A business telephone system as in claim 11 further comprising a Private Branch Exchange (PBX) connected to the digital telephone by the ISDN interface and to the general-purpose computer by a serial communication link.

13. A business telephone system as in claim 12 comprising multiple computers connected in a Local Area Network (LAN) with the PBX.

14. A business telephone system as in claim 10 further comprising an electronic memory connected to the control circuitry; a microphone-speaker unit connected to the control circuitry for audio input and output, including a coder/decoder (CODEC) for conversions between analog and digital data forms; and a user input interface connected to the control circuitry including a keypad for dialing and function selection.

15. A business telephone system as in claim 10 wherein the control circuitry comprises a microcontroller for managing control operations.

16. A business telephone system as in claim 15 wherein the control circuitry comprises a mask read only memory (ROM) for storing control routines for execution by the microcontroller.

17. A business telephone system as in claim 14 wherein the electronic memory comprises random access memory.

18. A business telephone system as in claim 14 wherein the electronic memory comprises flash memory.

19. A business telephone system as in claim 14 wherein the microphone-speaker unit comprises a handset connected to the control circuitry.

20. A business telephone system as in claim 14 wherein the microphone-speaker unit is configured as a speakerphone.

21. A business telephone system as in claim 14 wherein the user input interface comprises an LCD display for displaying functional and operational data to the user.

22. A business telephone system as in claim 14 wherein the user input interface comprises LEDs for indicating operational data to the user.

23. A business telephone system as in claim 10 wherein the serial communications link is configured for one of RS-232 and RS-485 protocol.

24. A business telephone system as in claim 10 wherein the at least one docking bay is configured to a Personal Computer Memory Card International Association (PCMCIA) standard, and is coupled to the control circuitry by a PCMCIA bus interface.

* * * * *